United States Patent [19]

Krieger et al.

[11] 4,213,333
[45] Jul. 22, 1980

[54] HIGH TORQUE MULTIPLIER AND READOUT APPARATUS

[75] Inventors: Raymond L. Krieger, Denver; Ralph W. Weaver, Aurora; Edward T. Able, Denver, all of Colo.

[73] Assignee: B. K. Sweeney Manufacturing Co., Denver, Colo.

[21] Appl. No.: 956,402

[22] Filed: Oct. 31, 1978

[51] Int. Cl.³ .............................................. G01L 3/02
[52] U.S. Cl. ...................................... 73/136 R; 73/139
[58] Field of Search ...................... 73/1 C, 136 R, 139; 173/12

[56] References Cited

U.S. PATENT DOCUMENTS

| 3,364,725 | 1/1968 | Grabovac | 73/1 C |
| 4,060,137 | 11/1977 | Bickford et al. | 173/12 |

Primary Examiner—Charles A. Ruehl
Attorney, Agent, or Firm—Gary M. Polumbus

[57] ABSTRACT

Reaction torque of a planetary gear type torque multiplier assembly is measured in apparatus which includes multiple stage torque multiplying apparatus and a torque readout meter which is operated by the reaction torque sensed. A reaction coupling arrangement operatively associated with a planetary torque multiplier includes a ring gear around which the planetary gears traverse. The ring gear is attached to a pivotable reaction torque cup. The reaction torque cup is biased by a pair of parallel extending deflection beams. As torque is applied, the ring gear deflects in accordance with reaction torque, and the amount of deflection is operatively coupled to the torque readout meter where an indication of torque is registered. The torque readout meter includes a stay set feature to maintain torque indications after the applied torque is terminated.

20 Claims, 10 Drawing Figures

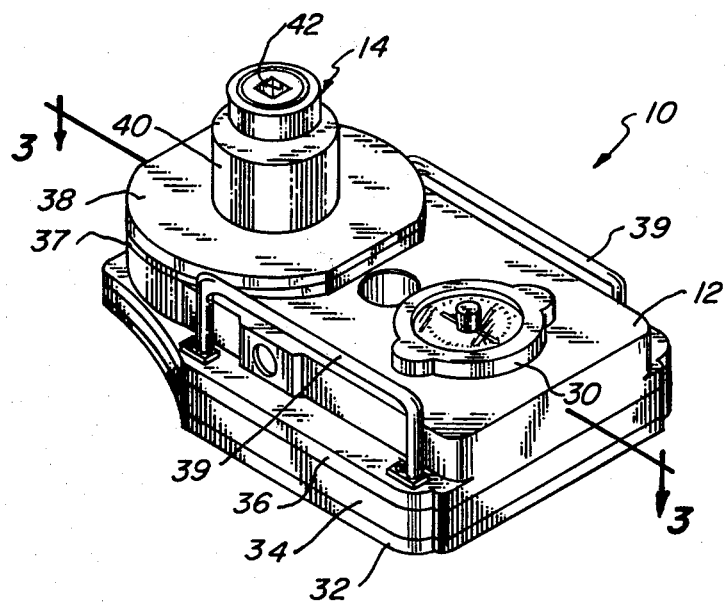
Fig_1
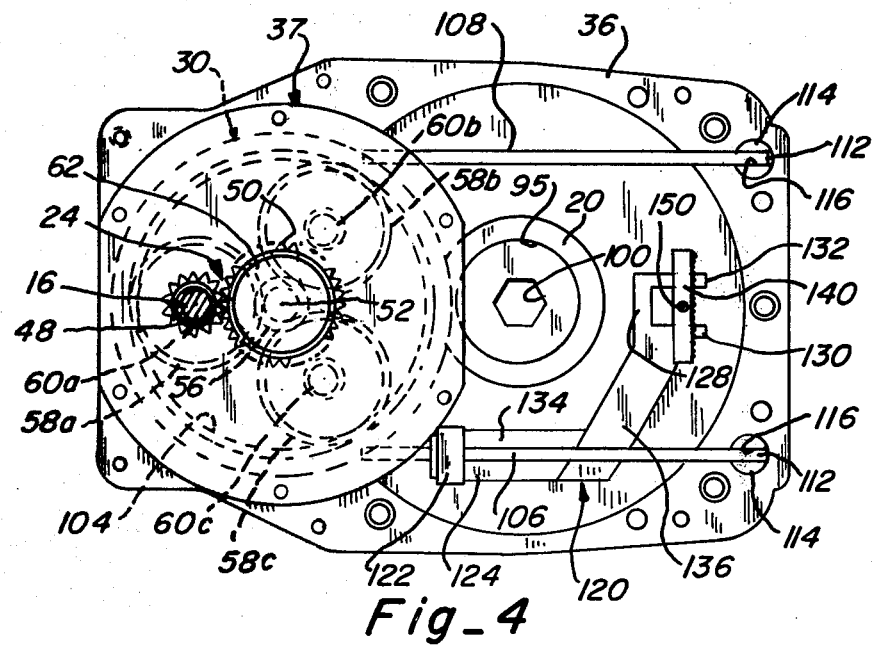
Fig_4

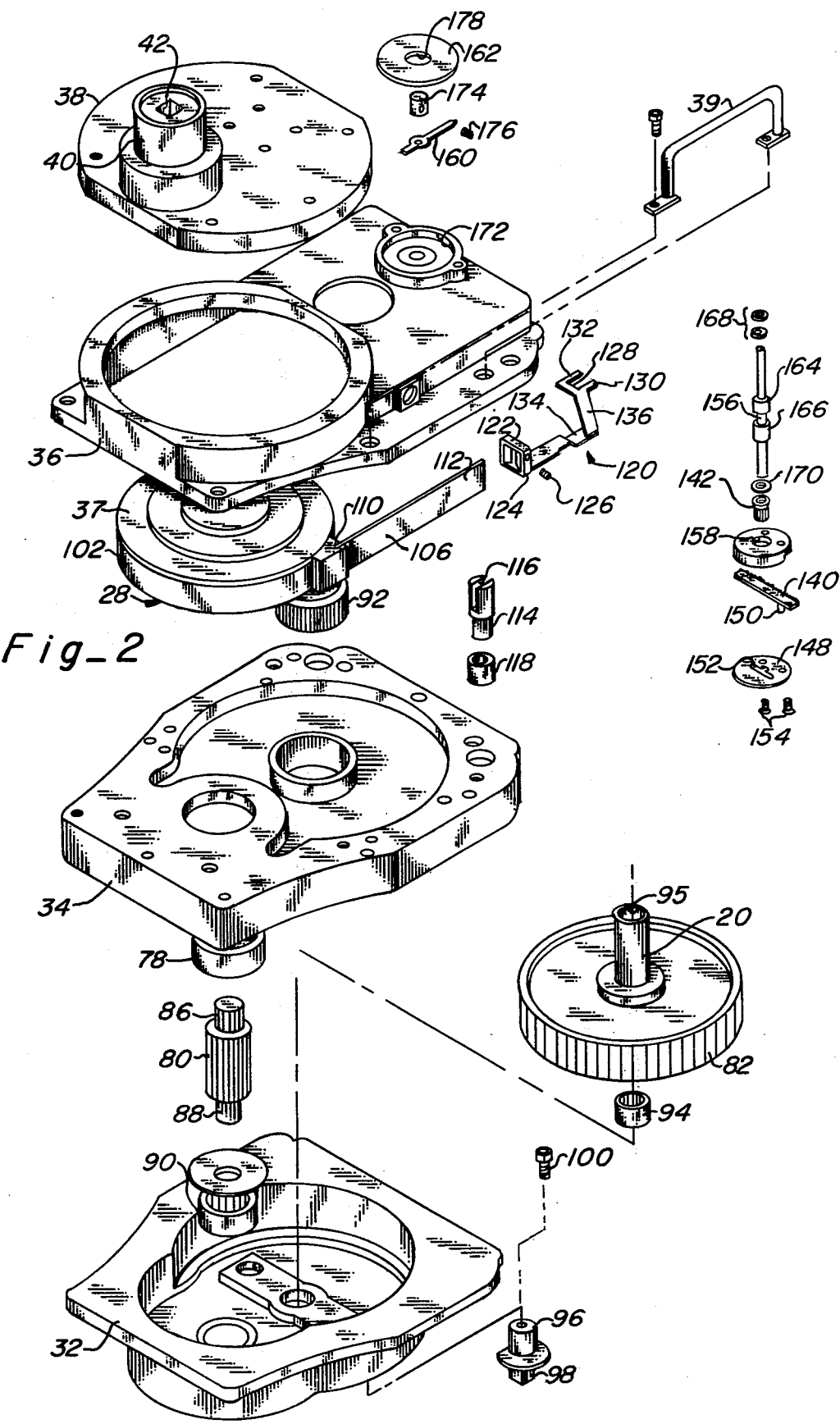

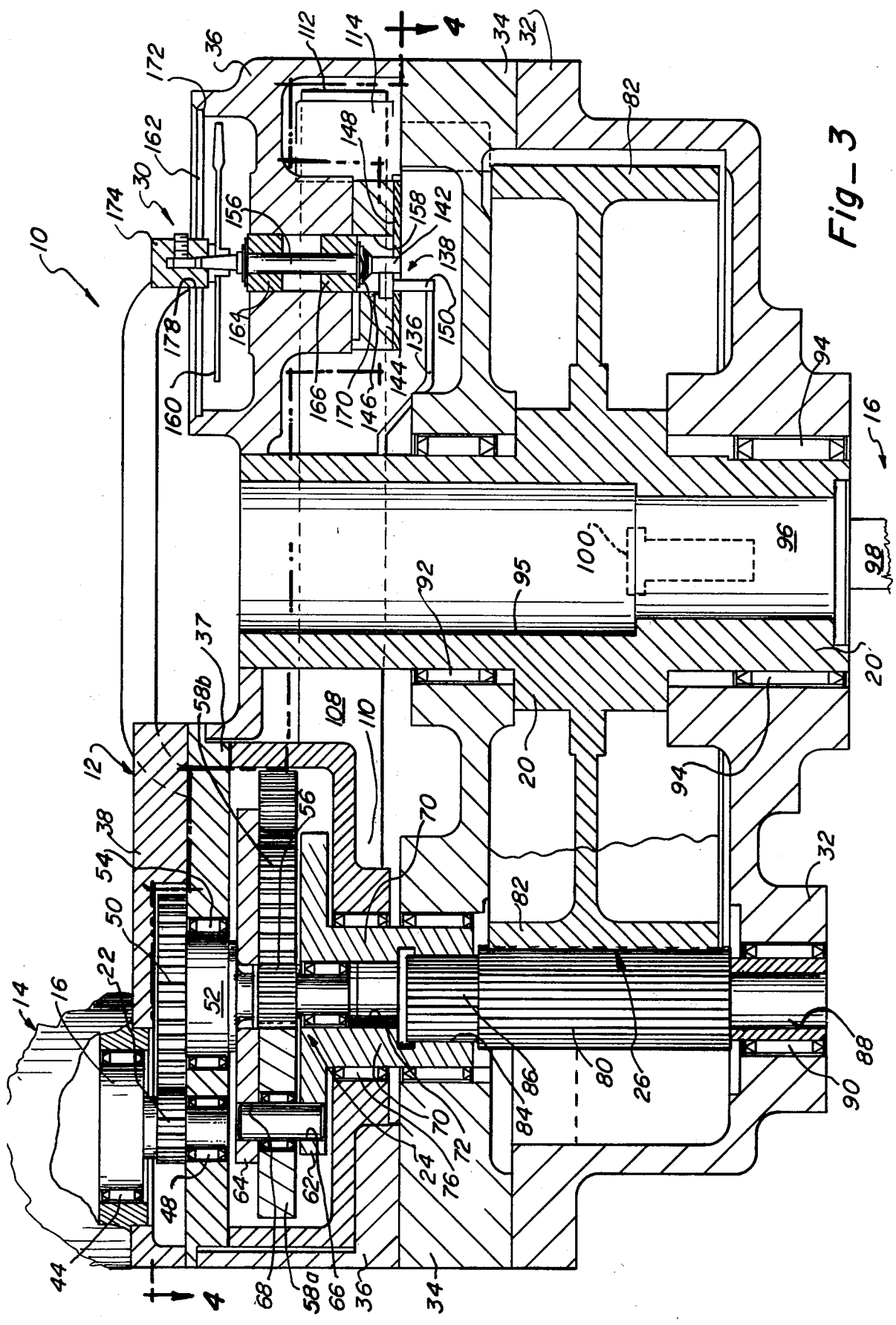
Fig_3

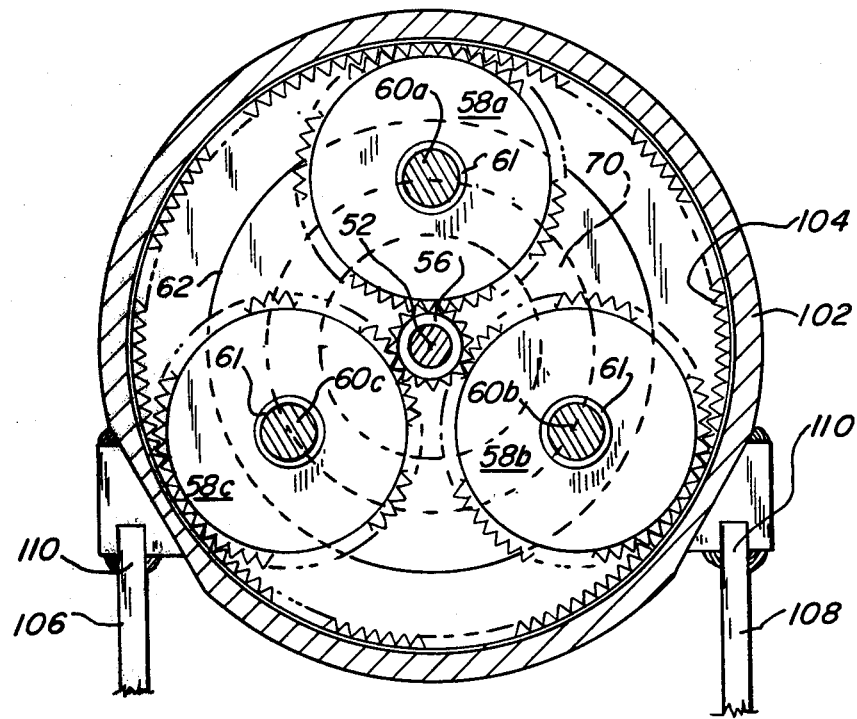
Fig_6
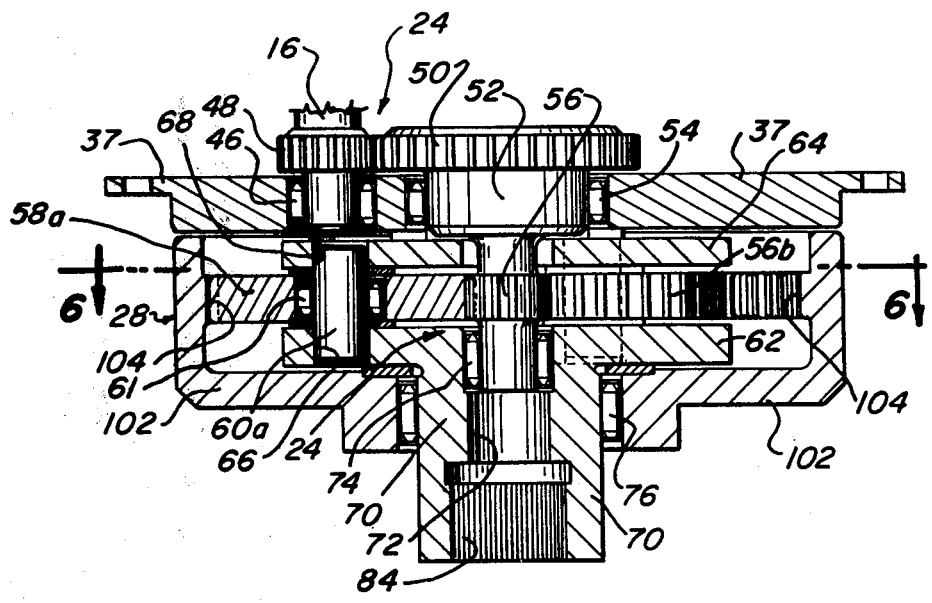
Fig_5

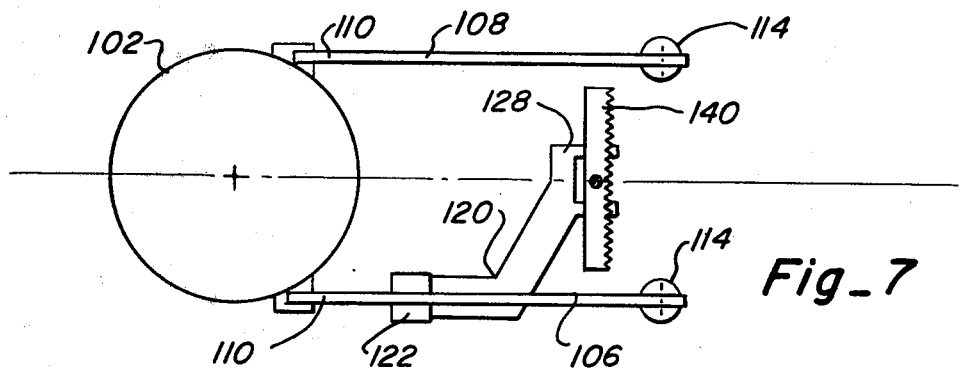
Fig_7
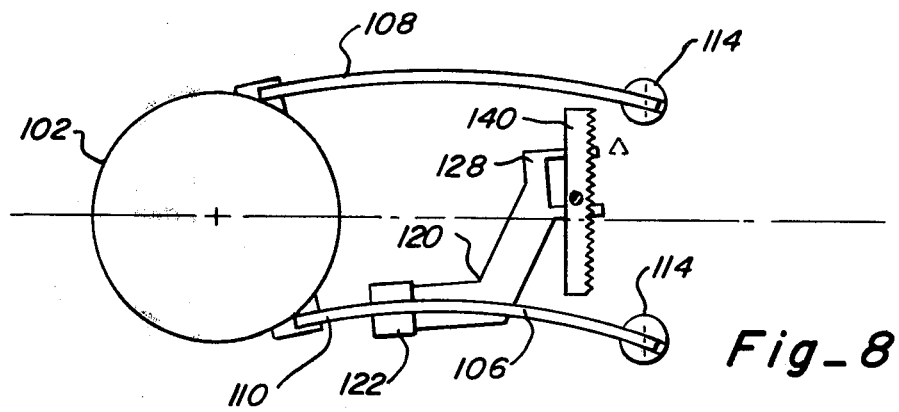
Fig_8
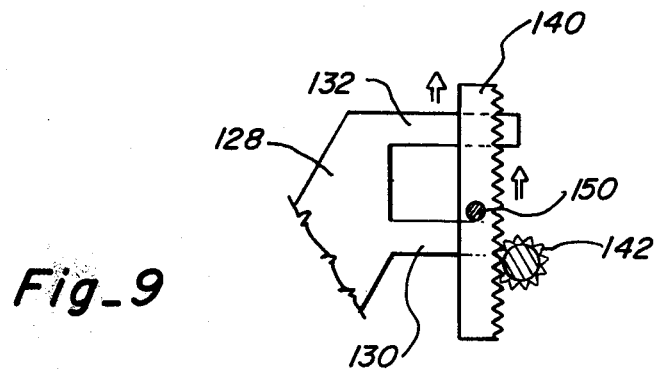
Fig_9
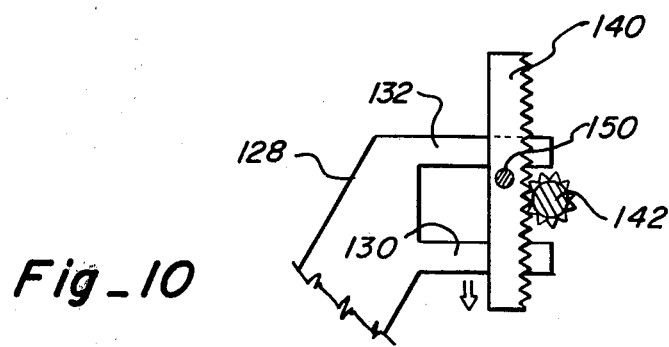
Fig_10

HIGH TORQUE MULTIPLIER AND READOUT APPARATUS

BACKGROUND OF THE INVENTION

This invention relates to torque multiplying and measuring tools, such as those commonly employed to repair military tanks, small gas turbine engines, diesel engines and to remove helicopter rotor nuts.

In many heavy equipment repair and maintenance situations parts must be assembled to or disassembled from existing structures in spaces which do not allow use of a long handled wrench. It is also not uncommon under these circumstances that very high torque must be applied to remove the parts. To safely and effectively repair or maintain these parts, it is usually necessary to apply specific amounts of torque to the nuts, bolts or the like. Other requirements, advantages and limitations are known or will become apparent to those skilled in the art.

SUMMARY OF THE INVENTION

Objectives

It is the primary objective of the present invention to provide a new and improved high torque multiplier and readout apparatus providing substantial advantages. Other objectives are to provide a relatively small assembly which achieves significant high torque multiplication and which is capable of accurately measuring relatively high torque values. Another objective is to teach a construction of a high torque multiplier which is relatively compact and small in overall dimensions so as to allow its use in relatively restricted spaces. A further objective is to provide a high torque multiplier which can be activated by a conventional socket wrench. A last objective is to measure very high torque by employing restraining and biasing elements which are not excessive in size to counteract the reaction torque.

The Invention

The present invention relates to a high torque multiplier and readout apparatus. The apparatus includes a main input shaft and a main output shaft which are rotatably interconnected in a housing by torque multiplying means. The torque multiplying means may comprise a plurality of torque multiplier stages operatively connected in series. One of the torque multiplier stages, preferably not the last multiplier stage, is operatively coupled with reaction means for sensing the amount of reaction torque present at that multiplier stage. Pivot means is pivotably attached to the housing, operatively associated with the reaction means and biased to an initial position by deflection means. An amount of deflection of the pivot means or deflection means under the influence of reaction torque is coupled by linkage means to a torque meter assembly which registers an indication of actual torque applied based on the reaction torque correlated to the amount of deflection.

In the preferred embodiment, one of the torque multiplier stages is a planetary gear assembly and the planetary gears traverse a ring gear associated with the planetary torque multiplier stage. The ring gear is connected to a reaction torque cup member which is pivotally positioned within the housing. A pair of spaced apart and longitudinally extending deflection beams extend from the reaction torque cup. A pusher member is selectively positioned on one of the beam members to operate the torque meter assembly. Upon application of torque through the torque multiplier apparatus, the ring gear restrains the reaction torque present at the planetary torque multiplier assembly. The pair of deflection beams provide a biasing force on the reaction torque cup and ring gear to resist the reaction torque. The deflection beams bow or curve as the reaction torque is restrained, and the pusher member deflects in relation to the amount of bowing or deflection of the beams.

Other advantages, benefits and features of the invention, as well as limitations in the prior art, can be more fully appreciated after referring to the following description of preferred embodiment of the invention taken in conjunction with the drawings briefly described below.

BRIEF DESCRIPTION OF THE DRAWINGS

FIG. 1 is a perspective view of the high torque multiplier readout embodying the present invention.

FIG. 2 is a view of the elements of the high torque multiplier and readout shown in exploded relationship.

FIG. 3 is an enlarged vertical sectional view taken substantially in the plane of line 3—3 in FIG. 1.

FIG. 4 is a horizontal section view taken substantially in the plane defined by lines 4—4 in FIG. 3.

FIG. 5 is a vertical section view of a reaction torque subassembly comprising a portion of the high torque multiplier and readout.

FIG. 6 is a horizontal section view of the reaction torque subassembly taken substantially in the plane of line 6—6 of FIG. 5.

FIG. 7 is a generalized view schematically illustrating certain elements of the apparatus shown in FIG. 4.

FIG. 8 is a view similar to FIG. 7 illustrating operation of the elements shown.

FIG. 9 is an enlarged view of certain elements shown in FIG. 8.

FIG. 10 is a view similar to FIG. 9 illustrating the condition of elements after torque has been applied, measured and released.

DESCRIPTION OF PREFERRED EMBODIMENT

Apparatus 10 defining a high torque multiplier and readout assembly is generally introduced by reference to FIGS. 1 and 2. The apparatus 10 includes a housing 12 generally containing and mounting various elements therein. Rotational torque is applied to the apparatus 10 at input means generally referenced 14. Typically, a conventional wrench is utilized to apply the input rotational torque, and the input rotational torque is coupled through the input means 14 by a main input shaft 16 (FIG. 3). Output means generally referenced 18 extends from the housing 12 and serves as means by which rotational torque is applied from the apparatus 10. The output means 18 includes a main output shaft 20 (FIGS. 2 and 3) which couples the rotational torque to an object to be rotated. Operatively interconnecting the main input shaft 16 and the main output shaft 20 are torque multiplying means for operatively increasing the torque applied to the main input shaft in predetermined relationship and supplying the increased or multiplied torque to the output shaft.

The torque multiplying means preferably includes a plurality, preferably three, of torque multiplying stages or subassemblies, respectively generally referenced 22, 24 and 26. These torque multiplying stages are operatively connected in series, and each stage multiplies torque and decreases rotational speed. The first and third torque multiplying stages each comprise a pinion gear set which includes a drive pinion gear and a driven pinion gear. The second torque multiplying stage comprises a planetary torque multiplying subassembly, shown in detail in FIGS. 5 and 6.

A reaction torque subassembly, generally referenced 28, is operatively associated with the planetary torque multiplying subassembly 24 to operatively sensing reaction torque available from operation of the planetary torque multiplying subassembly. The reaction torque is related to the torque applied as output from the second or planetary torque multiplying subassembly. Deflection means operatively biases the reaction torque subassembly 28 against the reaction torque of the planetary subassembly 28. The amount of deflection is operatively sensed and coupled to a torque readout or meter subassembly 30. The torque meter subassembly 30 registers or indicates a torque reading related in a predetermined manner to the amount of deflection sensed. An appropriate linkage means operatively transfers deflection or movement from said reaction torque subassembly to the torque meter subassembly.

Details of the construction and operation of the high torque multiplier and readout apparatus 10 follow.

Details of the housing 12 are best seen in FIGS. 2 and 3. The housing assembly 12 is formed and defined by a main housing member 32, an intermediate housing member 34, a top housing member 36, an upper intermediate cover member 37, and an upper cover member 38. The members 32–38 are preferably formed of cast aluminum and are joined together by suitable fastening means such as bolts as the various elements of the apparatus 10 are assembled. The members 32–38 are arranged to contain and support and rotationally receive the rotational elements of the apparatus 10. A handle 39 is connected to the housing to facilitate handling the apparatus 10.

Details of the input means 14 are best seen from FIG. 3. The input shaft 16 of the input means is operatively associated with a conventional reversible rachet assembly 40. The rachet assembly selectively maintains the main input shaft 16 in a rotationally stationary position in resistance to reaction torque applied through the apparatus 10, after input torque has been applied to the main input shaft. Thus, the rachet assembly locks and prevents reverse rotation after selected increments of additional torque are coupled through the apparatus 10 to the output means 18. The rachet 40 prevents the input wrench from springing back toward the user and also allows torque to be automatically held and applied until manually released. The rachet 40 is reversible allowing rotation in either direction. So as to connect the input means 14 with a conventional wrench, a square female socket 42 (FIGS. 1 and 2) is provided in an external element operatively connected to the main input shaft 16. Conventional needle bearing and race assemblies 44 and 46 operatively connect the main input shaft 16 for rotation in the housing 12.

Details of the first or input stage torque multiplier subassembly 22 are best seen in FIG. 3. The first torque multiplier subassembly 22 comprises a drive pinion gear 48 and a driven pinion gear 50. The drive pinion gear 48 is rigidly attached to the main input shaft 16, and preferably the pinion gear 48 and main shaft 16 are formed as an integral unit. The driven pinion gear 50 is rigidly attached to a shaft 52. The shaft 52 is rotatably mounted in the housing member 37 by means of a conventional bearing assembly 54. Preferably the driven pinion gear 50 and shaft 52 are formed as a integral unit. Retained thusly, the pinion gears 48–50 engage and mesh with one another and rotation of the drive pinion gear 48 by the main input shaft 16 rotates the driven pinion gear 50 and shaft 52. The diameter of the drive pinion gear 48 is considerably less than the diameter of the driven pinion gear 50, thus operatively providing a well-known torque multiplying and speed reducing effect.

Details of the second stage or planetary torque multiplier subassembly 24 are best seen from FIGS. 3, 5 and 6. The shaft 52 defines an input shaft for the planetary torque multiplier subassembly 24. A sun gear 56 is operatively connected to be rotated by the input shaft 52. Preferably the sun gear 56 is formed as an integral unit with the shaft 52. The sun gear 56 engages and meshes with and rotates a plurality of planetary gears 58a, 58b, and 58c. The planetary gears 58a, 58b and 58c are rotationally mounted on shafts 60a, 60b and 60c, respectively by conventional bearing assemblies 61. The shafts 60a, 60b and 60c extend between a flange 62 and an upper disc member 64. Openings 66 and 68 are respectively formed in the flange 62 and disc 64 to receive the shafts 60a, 60b and 60c. The upper disc 64 is thus held in spaced apart relation with respect to the flange 62 by the shaft 60a–60c. The space between the flange and the disc is slightly greater than the width of the planetary gears 58a–58c. The flange 62 is rigidly connected to an output shaft 70 of the planetary torque multiplier assembly 24. Preferably, the flange 62 and output shaft 70 are formed as an integral unit. An opening 72 is formed axially through the output shaft 70. The lower end of the input shaft 52 to the planetary torque multiplier assembly 24 is rotationally positioned in the opening 72 by a conventional bearing assembly 74. Conventional bearing assemblies 76 and 78 mount the output shaft 70 for rotation within the housing 12. Operation of the planetary torque multiplier subassembly 24 acheives a well known torque multiplication and speed reduction effect, between the input and output shafts.

Details of the third or output stage torque multiplier subassembly 26 are best seen from FIGS. 2 and 3. The third stage torque multiplier subassembly 26 includes a main drive pinion gear 80 and a main driven pinion gear 82. The driven pinion gear 82 comprises an output gear which is directly attached to the main output shaft 20. The drive pinion gear 80 is connected to be rotated by the output shaft 70 of the planetary torque multiplier subassembly 24. An internally splined socket 84 is formed in the lower end of the center opening 72 of the shaft 70 to receive a corresponding externally splined upper end portion 86 of the drive pinion gear 80. A lower cylindrical end 88 of the drive pinion gear 80 is rotationally positioned by a conventional bearing assembly 90 in the main housing member 32. Thus, the bearing assemblies 78 and 90 operatively hold the drive pinion gear 80 between cover members 32 and 34 in a stationary but rotational position. The driven pinion gear 82 may be formed as an integral unit with the main output shaft 20, or the gear 82 may be formed separately and attached to the shaft 20 as by welding. The main output shaft 20 is retained in a stationary but rotational position by conventional bearing assemblies 92 and 94 respectively received in the housing members 32 and 34. The pinion gears 80 and 82 engage and mesh with one another, and the drive pinion gear 80 rotates the driven pinion gear 82. The drive pinion gear 80 is of considerably lesser diameter than the diameter of the driven pinion gear 82, thereby achieving a well-known torque multiplication and speed reduction effect.

The main output shaft 20 is preferably formed with an axially extending opening 95 therethrough, the lower end of which is formed appropriately to receive a socket adapter 96 having a square male protruding end 98 for receiving a socket thereon. The socket adapter 96 is held in position by fastening means such as a bolt 100.

From the foregoing description it is apparent that rotational input torque operatively applied to the main input shaft 16 is coupled through the first stage torque multiplier subassembly 22 where torque multiplication occurs. The first stage mutliplied torque is applied to the second stage planetary torque multiplier subassembly 26, and further torque multiplication occurs. The second stage multiplied torque is coupled to the third stage torque multiplier subassembly 26. The third stage torque multiplier assembly multiplies torque even further and applies it at the main output shaft 20. Thus, the three stages of torque multiplication are connected in series to effect high overall torque multiplication ratio.

Details of the reaction torque subassembly 28 are best seen in FIGS. 3-6. The reaction torque subassembly comprises a pivot means in the preferable form of a reaction torque cup member 102, reaction coupling means in the preferable form of a ring gear 104, and deflection means in the preferable form of at least one but preferably a plurality of beam members 106 and 108. The cylindrically shaped reaction torque cup 102 is pivotably mounted within the housing by the bearing assembly 76 positioned intermediate the shaft 70 and the cup 102. The cup 102 is thus pivotably mounted with respect to the housing and the shaft 70. However, the reaction torque cup 102 is biased against pivoting from an initial position (FIGS. 4 and 7) by means of the deflection beams 106 and 108. Each of the beams 106 and 108 is rigidly connected to the cup 102 at their first ends 110, such as by welding. The other or second ends 112 of the beams 106 and 108 are pivotably connected to the housing by means of a swivel post shaft 114. In the initial position shown in FIG. 4, the deflection beams extend in parallel and spaced apart relationship and in a freely supported manner between the connected ends 110 and 112. Since the beams 106-108 are rigid members, they bias or hold the reaction torque cup 102 to the initial position until reaction torque is applied to the cup 102.

The reaction coupling ring gear 104 is operatively associated with both the reaction torque cup 102 and the second stage planetary torque multiplier subassembly 24. The ring gear 104 is rigidly attached to the cup 102, and the teeth of the ring gear engage and mesh with the teeth of the planetary gears 58a, 58b and 58c. It is necessary to the operation of the planetary torque multiplier subassembly 24 that the ring gear be held in essentially stationary position so that the planetary gears 58a-58c can operatively rotate the output shaft 70. It is the function of the deflection beams 106-108 to operatively hold the ring gear 104 in the stationary position. The force necessary to hold the reaction torque cup 102 and attach the ring gear 104 in essentially stationary position in the reaction torque coupled from the third stage torque multipler subassembly 26 back through the second stage planetary torque multiplier sub assembly 24 to the ring gear 104. The deflection beams 106-108 operatively bias the torque cup 102 to a stationary position against this reaction torque. The deflection beams 106-108 bow or deflect between their connected ends 110-112 until the bias force of the beams is equal and opposite to the reaction force on the ring gear. The cup 102 pivots until a position is reached where the beam bias force equals the reaction force. The amount of pivoting of the torque cup 102 is thus in predetermined relationship to the amount of bowing or deflection of the beam members 105-108. The amount of torque applied by the output means 18 of the apparatus 10 also bears a predetermined relationship to the amount of reaction torque present at the planetary torque multiplier subassembly 24. Thus, it is apparent that the amount of deflection of the beams or pivoting of the cup 102 bears a predetermined relationship to the amount of torque applied from the output means 18 of the apparatus 10. FIG. 1 illustrates the deflected condition of the beams 106-108 as a result of reaction torque present at the reaction torque cup 102 by operation of the planetary torque multiplier subassembly 24.

The connection of the pivoted ends 112 of the beams 106-108 to the swivel post shaft 114 allows deflection of the beams. A diametrically extending slot 116, shown in FIGS. 2 and 4, is formed through the swivel post shaft 114 to slideably receive the ends 112 of the beams 106-108. A conventional bearing assembly 118 pivotably connects the swivel post shaft 114 to the intermediate housing member 34. Thus, the swivel post member 114 is free to pivot in the housing and the diametrically extending slot 116 allows each beam end 112 to move longitudinally of the swivel post shaft 114 as deflection occurs.

Details of the torque meter subassembly 30, and linkage means operatively transferring movement to operate the torque meter subassembly 30 are best seen in FIGS. 2-4 and 7-10. The linkage means includes a pusher member 120. A U-shaped clamping member 122 is connected to one end 124 of the pusher member 120. The U-shaped clamping member 122 is one example of means for attaching the pusher member to a beam member 106 at a position adjacent the beam end 110. The U-shaped clamping member 122 fits around the beam and is held in position by a set screw 126. The other end 128 of the pusher member 120 is bifurcated, having two transversely separated and spaced apart projections 130 and 132. The middle portion of the pusher member 120 is formed in two segments 134 and 136. The segment 134 connects to the U-shaped clamping member 122 and the segment 136 extends to the bifurcated end 128. The segments 134 and 136 extend at an angle with respect to one another, with the segment 134 generally positioned in parallel relationship with the undeflected beam 106 and with the segment 136 positioning the bifurcated end 138 generally in the center of the housing 18 in position to operatively connect with the torque meter subassembly 30.

As the beam members 106 and 108 deflect under the influence of torque, as is shown in FIG. 7, the pusher member 108 pivots at an angle as the end 110 of the beam 106 is bowed. The bifurcated end 128 and projections 130 and 132 move transversely with respect to the longitudinal extensions of the beams 106-108. The amount of transverse movement of the bifurcated pusher end is related to the amount of reaction torque present at the reaction torque cup 102 and resisted by the deflected beams 106-108.

The segment 134 extends essentially in parallel relation to a geometric tangent to the bowed beam end 110 at the attachment point of the clamping member 122. A greater amount of bowing occurs at attachment points on the beam more closely spaced to the beam end 110 and a lesser amount of bowing occurs at attachment points more closely spaced to the midpoint of the beam between the ends 110 and 120. By adjusting the position of the clamping member 122 along the beam adjacent the end 110, calibration between torque applied at the output means 18 and the torque indicated by the torque meter 30 is obtained.

Transverse movement of the bifurcated end 128 of the pusher member 120 operates the torque meter 30. The torque meter subassembly 30 includes a rack and pinion gear assembly 138 which includes a rack gear 140 and a pinion gear 142. A rack attachment block member 144 includes a channel 146 formed therein to receive and position the rack gear 140 for longitudinal movement. Longitudinal movement of the rack gear 140 is essentially transverse with respect to the pusher segment 136. The rack gear is held in the channel 146 by a washer 148. A downward dependent tab 150 is formed on the rack gear 140. One of the projections 130 or 132 of the pusher member 120 contacts the tab 150 and moves the rack gear longitudinally when the bifurcated end 128 moves transversely as the beam 106 deflects. A transverse slot 152 is formed in the washer 148 to receive the downward extending tab 150 and to allow longitudinal movement of the rack gear 140. Fastening means such as screws 154 extend through the washer 148, the attachment block 144 and into the top housing member 36 to attach the elements 140, 144 and 148 in assembled relation.

Details of the torque meter subassembly 30 are best seen from FIGS. 2 and 3. The torque meter subassembly 30 includes a main rotational meter shaft 156. At the lower end of the shaft 156 the pinion gear 142 of the rack and pinion gear assembly 138 is rigidly connected. The pinion gear 142 fits within an opening 158 formed in the attachment block 144, and the pinion gear 142 meshes with the rack gear 140. At the other end of the main meter shaft 156, an indicator or pointer 160 is rigidly connected. A marked scale 162 is provided in juxtaposition with the pointer 160 for the purpose of indicating torque. Upon longitudinal movement of the rack gear 140 by deflection of the deflection beam 106, the pinion gear 142 rotates the shaft 156 an amount proportional to longitudinal movement of the rack gear. The rotating or pivoting shaft 156 rotates the pointer 160 relative to the scale 162, thus providing an indication of torque. The amount of rotation of the pinion gear 142, the shaft 156 and the pointer 160 is related to the amount of torque applied, as determined by the amount of deflection of the beams 106 and 108 in the manner previously described.

The shaft 156 of the torque meter subassembly 30 is mounted for rotation in the top housing member 36 by bearing blocks 164 and 166. A snap ring and washer assembly 168 is attached to the shaft 156 upwardly adjacent the bearing block 164. Downwardly adjacent the bearing block 166 to prevent axial movement of the shaft 156 in one direction. At the other end of the shaft adjacent the pinion gear 142, a wave washer 170 applies a slight axial biasing force on the shaft 156 from the bearing block 166. This axial biasing force is sufficient to prevent spurious rotational movement of the shaft 156 and pointer 160 unless intentionally rotated by the mechanism described.

The pointer 160 is preferably frictionally attached to the upper end of the shaft 156. Spaced above and axially outward from the pointer 156 is the marked meter scale 162. The scale is transparent so that movement of the pointer below the scale can be readily discerned. The scale 162 includes a zero reference point and various marked graduations indicating increments of torque. The scale 162 is rotatably received within a circular shaped opening 172 formed in the top housing member 56. Screws (not shown) hold the scale and when loosened, allow the scale to be rotated to a desired position. At the terminal upper end of the shaft 156, a knob member 174 is connected by a set screw 176. The knob 174 extends through an opening 178 of the scale 162. The knob member can be rotated to rotate the shaft 156 and the pointer 160. Some rotation of the meter shaft is possible due to the space between the projections 130–132 on the bifurcated end 128 of the pusher member 120. The knob member 174 and meter shaft can be rotated until the tab 150 contacts one or the other of the projections 130–132. At the contact point of the tab 150 with a projection 130 or 132, the pointer 160 defines an initial or beginning position from which torque is measured. At the beginning position, the scale 162 is rotated so that the zero marking on the scale is positioned immediately above the tip of the pointer 160. In this arrangement, the meter 30 is in a condition ready to measure torque.

In use, an appropriate socket is attached to the square projection 98 of the output means 18 and the socket positioned on a nut or other object to which rotational torque is to be applied. The apparatus 10 is set in place by use of the handles 39. The apparatus 10 is further anchored by suitable means in a stationary or non-rotational position. The knob member 174 is rotated to an initial beginning position, moving the rack gear 140 and tab 150 until the tab contacts one or the other of the projections 130–132. This condition is illustrated in FIG. 9 with the tab 150 contacting the projection 130. The zero indication on the scale 162 is aligned with the tip of the pointer 160. A wrench is connected to the square female socket 42 of the input means 14. Rotational torque is applied to the wrench, and the main input shaft 16 is rotated. Speed reduction and torque multiplication is achieved by operation of the first stage torque multiplier subassembly 22. Increased rotational torque is supplied from the first torque multiplier subassembly 22 by the shaft 52 to the second stage planetary torque multiplier subassembly 24. Rotation of the sun gear 56 rotates the planetary gears 58a, 58b and 58c. The rotating planetary gears apply a reaction torque to the ring gear 104 which is rigidly attached in the torque reaction cup 102. The reaction torque pivots the cup 102 until an equal and opposite biasing force is obtained through deflection of the beam members 106 and 108. Once the opposite reaction torque is obtained, the ring gear is maintained in a stationary but pivoted position. The ring gear 104, torque reaction cup 102 and deflection beams 106 and 108 operatively cause the planetary gears of the second stage planetary torque multiplier subassembly to rotate the output shaft 70 from the second stage multiplier 26. The rotational output from shaft 70 is coupled through the output or drive pinion gear 80 and output or driven pinion gear 82 to the main output shaft 20, and from, the shaft 20 to the object to be rotated.

As the beams 106 and 108 deflect as has been described, the bifurcated end 128 of the pusher member 120 deflects transversely, as is shown in FIGS. 8 and 9. The projection 130 moves the tab 150 of the rack gear 140 longitudinally (upwardly in FIG. 9), and the rack gear 140 rotates the pinion gear 142. The rotating meter shaft 156 deflects the pointer 160 a predetermined amount related to the amount of torque applied, as determined by the pivoting reaction torque cup. The amount of deflection of the pointer is correlated to indicate the amount of torque applied, as determined by the marked graduations of the scale 162.

Once torque is applied, the rachet assembly 40 of the input means 14 operatively holds the amount of torque applied by the wrench. Thus, the rotating elements of the first, second and third torque multiplier subassemblies are maintained in a stationary position. The reaction torque is thus maintained at a constant and the reaction torque cup 102 is maintained in its pivoted condition. The input torque is held until the ratchet assembly is manually released.

After torque has been applied, and the ratchet released, the pointer 160 maintains its maximum reading position. The space between projections 130-132 is sufficient so that the projection 132 does not contact the tab 150 after torque is released and the beam 106 and pusher member 120 return to the initial position, as shown in FIG. 10. Thus, when the pusher member 120 returns to its initial position (FIG. 7), the tab 150 is intermediate the projections 130-132. The slight axial force from the wave washer 170 maintains the pointer 160 at the maximum torque indication obtained. Thus, the wave washer 170 causes the pointer to stay set at the maximum amount of torque applied.

It should be noted that torque can be measured in either rotational direction. Rotating the knob member 174 until the tab 150 contacts one of the projection members 130-132 which will move the rack gear in the direction in accordance with the rotational direction of the applied torque allows measurement in either rotational direction.

It is apparent from the foregoing description of the high torque multiplier and readout apparatus 10 that extremely high torque multiplication is obtained by a relatively compact apparatus. In an actual embodiment of the apparatus 10, an overall torque multiplication ratio of 165 to 1 can be obtained in an apparatus having exterior housing dimensions of approximately 7 inches by 10 inches by 8 inches. The apparatus 10 is arranged for convenient operation by use of a conventional socket wrench applied to the input. Furthermore by measuring reaction torque from the outside ring gear of a planetary gear arrangement does not require biasing against reaction torque of the same magnitude of that applied from its output shaft, thereby allowing use of relatively small and compact deflection beams. It is further apparent that the apparatus 10 is small enough to be used in very restricted places.

A preferred embodiment of the present invention has been described with a degree of particularity. It should be understood, however, that the specificity of the present disclosure has been made by way of example, and that changes in details of features and construction and operation may be made without departing from the spirit of the invention.

What is claimed is:

1. A torque multiplier and readout apparatus, comprising:
   a housing;
   a main input shaft and a main output shaft rotatably received by said housing;
   torque multiplying means operatively interconnecting said main input and said main output shafts for rotation, said torque multiplying means operatively increasing the torque applied to the main input shaft and supplying the increased torque to the main output shaft;
   pivot means pivotably attached to said housing;
   deflection means operatively connected between said pivot means and said housing for biasing said pivot means toward an initial position, said deflection means applying biasing force to said pivot means in predetermined magnitude related to the amount of pivoting of the pivot means away from the initial position, said deflection means comprising a plurality of elongated beam members, each beam member having deflection characteristics, each beam member being operatively connected at one end to said pivot means and operatively connected at the other end to said housing, at least two of said beam members being operatively connected at different positions to said pivot means;
   reaction coupling means operatively connecting said pivot means with said torque multiplying means, said reaction coupling means coupling to said pivot means reaction torque resulting from torque multiplication by said torque multiplying means, the magnitude of reaction torque coupled to said pivot means bearing a predetermined relation to the increased torque applied to the output shaft;
   a torque meter apparatus attached to said housing, said torque meter apparatus including a meter input member for operating said meter apparatus to indicate torque; and
   means operatively connecting said pivot means and said meter input member for operatively transforming movement from said pivot means to activate the meter input member of said torque meter assembly to indicate torque applied by said output shaft.

2. An apparatus as recited in claim 1 wherein:
   said torque multiplying means comprises a planetary torque multiplier assembly, said planetary torque multiplier assembly comprises: an input shaft, a sun gear connected to said input shaft, an output shaft, and at least one planetary gear connected for rotation on said output shaft, said planetary gear connected to mesh with said sun gear and to rotate said output shaft when said sun gear is rotated;
   said pivot means comprises a reaction torque cup pivotably positioned within said housing in generally coaxial relation with the output shaft of said planetary torque multiplier assembly; and
   said reaction coupling means comprises a ring gear attached to said reaction torque cup in an operative position to mesh with at least one planetary gear of said planetary torque multiplier assembly.

3. A torque multiplier and readout apparatus comprising:
   a housing;
   a main input shaft and a main output shaft rotatably received by said housing;
   torque multiplying means operatively interconnecting said main input and said main output shafts for rotation, said torque multiplying means operatively increasing the torque applied to the main input shaft and supplying the increased torque to the main output shaft;
   pivot means pivotably attached to said housing;
   deflection means operatively connected between said pivot means and said housing for biasing said pivot means toward an initial position, said deflection means applying biasing force to said pivot means in predetermined magnitude related to the amount of pivoting of the pivot means away from the initial position, said deflection means comprising a plurality of elongated beam members, each elongated beam member having deflection characteristics, and each elongated beam member rigidly connected at one end to said pivot means and connected at the other end to said housing, each of said beam members connecting to said pivot means at a different position on said pivot means;

reaction coupling means operatively connecting said pivot means with said torque multiplying means, said reaction coupling means coupling to said pivot means reaction torque resulting from torque multiplication by said torque multiplying means, the magnitude of reaction torque coupled to said pivot means bearing a predetermined relation to the increased torque applied to the output shaft;

a torque meter apparatus attached to said housing, said torque meter apparatus including a movable meter input member for operating said meter apparatus to indicate torque;

linkage means operatively connecting said pivot means and said meter input member for operatively transferring movement from said pivot means to the meter input member of said torque meter assembly.

4. An apparatus as recited in claim 3 wherein:

said torque multiplying means comprises a planetary torque multiplier assembly, said planetary torque multiplier assembly comprising:
  an input shaft,
  a sun gear connected to said input shaft,
  an output shaft,
  at least one planetary gear connected for rotation on said output shaft, said planetary gear connected to mesh with said sun gear and to rotate said output shaft when said sun gear is rotated;

said pivot means comprises a reaction torque cup pivotably positioned within said housing in generally coaxial relation with the output shaft of said planetary torque multiplier assembly;

said reaction coupling means comprising a ring gear attached to said reaction torque cup in an operative position to mesh with at least one planetary gear of said planetary torque multiplier assembly; and each elongated beam member is rigidly connected at one end to said reaction torque cup at a different position on said reaction torque cup.

5. An apparatus as recited in claim 4 wherein:
the meter input member comprises a rotatable meter input shaft; and
said linkage means comprises a pusher member rigidly attached to one of said deflection beams at a position to move upon deflection of said beam, and means operatively connecting the pusher member for rotating the meter input shaft.

6. An apparatus as recited in claim 5 wherein said means for connecting the pusher member for rotating the meter input shaft comprises a meter gear assembly including a rack gear and a pinion gear, the meter pinion gear being attached to said meter input shaft, and the meter rack gear being operatively positioned by said housing to allow longitudinal movement and being operatively connected to said meter pinion gear.

7. An apparatus as recited in claims 1 or 3 wherein each of said plurality of beam members extends from said pivot means in parallel and spaced apart relation.

8. An apparatus as recited in claims 4 or 2 wherein said torque multiplying means comprises a plurality of torque multiplying stages operatively connected in series, each stage being a separate torque multiplier assembly, said planetary torque multiplier assembly being one of the stages.

9. An apparatus as recited in claims 4 or 2 wherein:
said torque multiplying means comprises three torque multiplying stages operatively connected in series, each stage being a separate torque multiplier assembly, the first of the stages being an input torque multiplier assembly operatively connected to receive rotational torque from said main input shaft, the second of the stages being said planetary torque multiplier assembly, the input shaft of said planetary torque multiplier assembly being operatively connected to receive torque from said input torque multiplier assembly, the third of the stages being an output torque multiplier assembly, said output torque multiplier assembly receiving rotational torque from the output shaft of said planetary torque multiplier, and said output torque multiplier assembly being operatively connected to supply torque to the main output shaft.

10. An apparatus as recited in claim 9 wherein said input and said output torque multiplier assemblies each comprise a pinion gear set, each pinion gear set comprising a drive pinion gear and a driven pinion gear, the drive pinion gear of each set being of smaller diameter than the driven pinion gear of each set.

11. An apparatus as recited in claims 4 or 2 further comprising:
means operatively associated with said main input shaft for selectively maintaining said main input shaft in a stationary rotational position in resistance to rotational reaction torque applied through said torque multiplying means, after input torque has been applied to said main input shaft.

12. An apparatus as recited in claim 11 wherein said means for selectively maintaining the main input shaft in stationary position in resistance to reaction torque comprises a reversible rachet means.

13. A high torque multiplier and readout apparatus, comprising:
a housing;
input means adapted to be rotated by force applying apparatus, said input means including a main input shaft rotatably received within said housing;
a first torque multiplier assembly comprising a gear set including a drive pinion gear and a driven pinion gear both rotatably connected in meshing and engaging relationship within said housing, the drive pinion gear operatively connected for rotation by said main input shaft, the drive pinion gear being of lesser diameter than the diameter of the driven pinion gear;
a second torque multiplier assembly comprising a planetary torque multiplier assembly operatively connected within said housing, said planetary torque multiplier assembly comprising:
  an input shaft operatively connected to be rotated by the driven pinion gear of said first torque multiplier assembly,
  a sun gear connected to the input shaft of said planetary torque multiplier assembly;

an output shaft of said planetary torque multiplier assembly, and at least one planetary gear connected for rotation on the output shaft of said planetary torque multiplier assembly, said planetary gear connected to engage and mesh with said sun gear and to rotate the output shaft of said planetary torque multiplier assembly when said sun gear is rotated;

a third torque multiplier assembly comprising a gear set including a drive pinion gear and a driven pinion gear both rotatably connected in meshing and engaging relation within said housing, the drive pinion gear operatively connected for rotation by the output shaft of said planetary torque multiplier assembly, the drive pinion gear being of lesser diameter than the diameter of the driven pinion gear;

output means including a main output shaft rotatably received by said housing, said output means adapted to apply rotational torque to an object to be rotated, said main output shaft operatively connected to be rotated by the driven gear of said third torque multiplier assembly;

a reaction torque cup pivotably positioned within said housing in generally coaxial relation with the output shaft of said planetary torque multiplier assembly;

a ring gear attached to said reaction torque cup in an operative position to engage and mesh with at least one of said planetary gears of said planetary torque multiplier assembly;

at least one elongated rigid deflectable beam member, each beam member having first and second opposite ends connected respectively to the reaction torque cup and to the housing, each beam member extending in a freely supported manner within said housing between its connected ends, each said beam member operatively biasing said reaction torque cup and said ring gear against pivoting away from an initial position;

a torque meter assembly attached to said housing and comprising a scale, an indicator operatively associated with the scale, and meter operating means for moving the indicator relative to the scale;

a pusher member operatively attached to one of said beam members at a position intermediate the first and second ends of said beam member; and means operatively connecting said pusher member and said meter operating means of said torque meter assembly for applying movement to said meter operating means, thereby obtaining an indication of torque.

14. An apparatus as recited in claim 13 wherein said meter operating means further comprises:
a meter shaft attached to the indicator of said torque meter assembly;
a pinion gear attached to the meter shaft; and
a rack gear operatively attached for longitudinal movement relative to said housing and connected to mesh with the pinion gear.

15. An apparatus as recited in claim 14 wherein:
said meter operating means further comprises a dependent tab member operatively connected to said rack gear; and
said pusher member has first and second oppositely spaced ends, the first end including means for rigidly attaching the pusher member to the beam member at a position adjacent first end of said beam member, the second end of said pusher member being bifurcated and defining spaced apart portions, the second end of said pusher member receiving the tab member intermediate the spaced apart portions.

16. An apparatus as recited in claim 15 wherein the first end of said pusher member is selectively connectable at adjustable positions along the first end of said beam member.

17. An apparatus as recited in claim 13 wherein:
said meter operating means includes a meter shaft attached to the indicator for rotating the indicator relative to the scale to indicate torque; and
said torque meter assembly further comprises a knob member connected to the meter shaft whereby rotation of the knob member rotates the indicator to a selected initial position.

18. A high torque multiplier and readout apparatus, comprising:
a housing;
input means adapted to be rotated by force applying apparatus, said input means including a main input shaft rotatably received within said housing;
a first torque multiplier assembly comprising a gear set including a drive pinion gear and a driven pinion gear both rotatably connected in meshing and engaging relationship within said housing, the drive pinion gear operatively connected for rotation by said main input shaft, the drive pinion gear being of lesser diameter than the diameter of the driven pinion gear;
a second torque multiplier assembly comprising a planetary torque multiplier assembly operatively connected within said housing, said planetary torque multiplier assembly comprising:
an input shaft operatively connected to be rotated by the driven pinion gear of said first torque multiplier assembly,
a sun gear connected to the input shaft of said planetary torque multiplier assembly,
an output shaft of said planetary torque multiplier assembly, and
at least one planetary gear connected for rotation on the output shaft of said planetary torque multiplier assembly, said planetary gear connected to engage and mesh with said sun gear and to rotate the output shaft of said planetary torque multiplier assembly when said sun gear is rotated;
a third torque multiplier assembly comprising a gear set including a drive pinion gear and a driven pinion gear both rotatably connected in meshing and engaging relation within said housing, the drive pinion gear operatively connected for rotation by the output shaft of said planetary torque multiplier assembly, the drive pinion gear being of lesser diameter than the diameter of the driven pinion gear;
output means including a main output shaft rotatably received by said housing, said output means adapted to apply rotational torque to an object to be rotated, said main output shaft operatively connected to be rotated by the driven gear of said third torque multiplier assembly;
a reaction torque cup pivotably positioned within said housing in generally coaxial relation with the output shaft of said planetary torque multiplier assembly;

a ring gear attached to said reaction torque cup in an operative position to engage and mesh with at least one planetary gear of said planetary torque multiplier assembly;

at least one elongated rigid deflectable beam member, each beam member having first and second opposite ends connected respectively to the reaction torque cup and to the housing, each beam member extending in a freely supported manner within said housing between its connected ends, each said beam member operatively biasing said reaction torque cup and said ring gear against pivoting away from an initial position;

a torque meter assembly attached to said housing and comprising an indicator for indicating torque; and means operatively interconnecting said torque meter assembly and at least one of said beam members for supplying an indication to said indicator of said torque meter assembly representative of the amount of deflection of said beam member.

19. An apparatus as recited in claims 13 or 18 wherein two beam members are connected at the first ends thereof to said reaction torque cup, said beam members extending in essentially parallel and spaced apart relation with respect to one another, the second ends of said beam members being pivotably connected to said housing.

20. An assembly as recited in claim 19 wherein the second end of each of said beam members is pivotably connected to said housing by means of a swivel post shaft pivotably attached to said housing and defining a slot extending therein, the slot receiving the second end of said beam member therein.

* * * * *

UNITED STATES PATENT AND TRADEMARK OFFICE
CERTIFICATE OF CORRECTION

PATENT NO. : 4,213,333
DATED : July 22, 1980
INVENTOR(S) : Raymond L. Krieger, et al It is certified that error appears in the above-identified patent and that said Letters Patent are hereby corrected as shown below:

In Fig. 3, the reference numeral "16" in the lower right hand corner should be --18--.

Signed and Sealed this

Twenty-eighth Day of October 1980

[SEAL]

Attest:

SIDNEY A. DIAMOND

Attesting Officer

Commissioner of Patents and Trademarks